even though no pressure is being supplied by the pump.

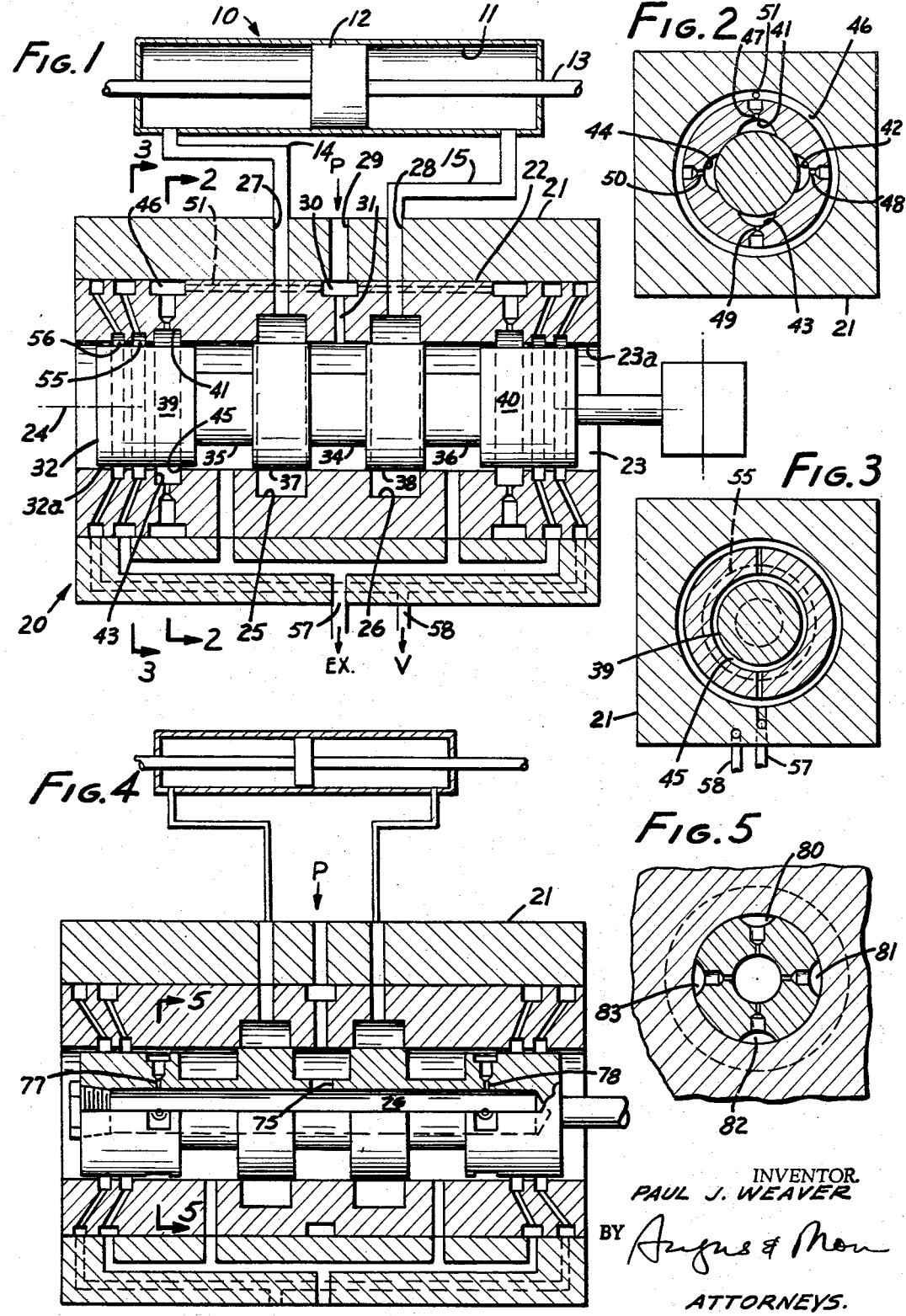

United States Patent Office 3,370,613
Patented Feb. 27, 1968

3,370,613
HYDRAULICALLY-CENTERED SPOOL VALVE
Paul J. Weaver, Pasadena, Calif., assignor to True-Trace Corporation, El Monte, Calif., a corporation of Connecticut
Filed Oct. 15, 1965, Ser. No. 496,405
16 Claims. (Cl. 137—625.69)

This invention relates to means for aligning the spool of a tracer valve in its sleeve.

Tracer valves are frequently used in the control of machine tools and customarily include a sleeve member which has an internal, axially extending sleeve passage that is bounded at least in part by an internal cylindrical wall. A spool member is formed inside the sleeve passage, which spool is bounded at least in part by an external axially-extending cylindrical wall. The cylindrical walls are at least in part axially coextensive. Somewhere along the coextensive part there are disposed various pressure, exhaust and motor supply grooves. Fluid under pressure is selectively supplied to one or the other of the motor supply grooves as a function of the shift of the spool within the sleeve. Such valves are well known and exemplars may be found in United States patents to Rosebrook Nos. 2,753,145 issued July 3, 1956, and 2,835,466, issued May 20, 1958. The particular conduitry used by the tracer valves to control the fluid supply to motors is of no importance to this invention and will not be described here in detail.

In tracer valves, frictional effects within the valve itself can be of significant importance to the performance of the valve. The maintenance of an easy steady motion of the stylus along the template, and the minimizing of the pressure between the stylus and the template, are of considerable importance to the accuracy of the part being manufactured. These are in turn functions of the alignment of the spool within the sleeve. Heretofore, the natural lubrication caused by the flow of hydraulic fluid between the spool and the sleeve has been relied on to maintain the alignment, but experimentation has shown that if a highly precise valve is desired, such lubrication is not in itself enough to prevent sticking, binding or other similarly undesirable characteristics.

Accordingly, it is an object of this invention to provide means for aligning the spool in the sleeve, which means is automatic and reliable, and which does not rely upon the inherent lubrication of the valve.

A tracer valve including these improvements has a plurality of recesses formed in one of said cylindrical walls within the coextensive region, these recesses being uniformly spaced around the axis. A pressure conduit passes through one of the members and opens into each of said recesses. There is an orifice in each of said pressure conduits. An exhaust conduit opens into the coextensive region between the walls in adjacency to the recess. Each recess and the clearance surrounding it provide a portion of a fluid path from the pressure conduit to the exhaust conduit. When pressure is exerted in the pressure conduit, the recess, the clearance, and the exhaust passages will fill with fluid. Thereafter, when the spool shifts laterally toward one of the recesses, it will shift laterally away from one of the others. When it shifts closer to one of the recesses, the flow region surrounding that recess diminishes in flow cross-section, and the pressure goes up in that recess. Conversely, the pressure diminishes in another opposite recess, and the resultant is an unbalanced force which tends to restore the spool to concentricity within the spool passage. This is a damped effect, so the correction never overshoots, but instead is self-correcting toward the central axis.

According to a preferred but optional feature of the invention, the exhaust conduit includes a peripheral groove in one of the cylindrical walls within a coextensive region, and a bore through one of the members opening into the said peripheral groove.

The above and other features of this invention will be fully understood from the following detailed description and the accompanying drawings in which:

FIG. 1 is a side elevation, partly in cutaway cross-section, and partly in schematic notation, showing the presently preferred embodiment of the invention;

FIG. 2 is a cross-section taken at line 2—2 of FIG. 1;

FIG. 3 is a cross-section taken at line 3—3 of FIG. 1;

FIG. 4 is a fragmentary cross-section showing an alternate embodiment of the invention; and FIG. 5 is a cross-section taken at line 5—5 of FIG. 4.

The presently preferred embodiment of the invention is shown in FIG. 1 wherein a motor 10 having a cylinder 11, piston 12, and doubled-ended rod 13 is adapted to be shifted to the left or right, depending on which, if either, of motor supply lines 14, 15 has a pressure and which has an exhaust connection thereto. Alternately, both could be equally pressurized, and there would be no actuation of the motor.

Control over the motor is exerted by tracer valve 20 in accordance with known tracer valve principles.

The valve includes a body 21 within which is fitted a sleeve 22. The sleeve is press-fitted in the body and includes a central spool passage 23 with an internal cylindrical wall 23a which have an axis 24. This wall has formed in it a pair of motor supply grooves 25, 26, which communicate through motor supply ports 27, 28 to motor supply lines 14, 15, respectively. A pressure line 29 passes through the body and opens into a supply groove 30 which is peripherally formed on the outside of the sleeve. A pressure supply port 31 interconnects groove 30 with the inside surface of the spool passage. Port 31 opens into the spool passage between the motor supply ports.

Inside the spool passage there is placed a spool member 32 with an external cylindrical wall 32a which have an axis parallel to and preferably coincident with axis 24. Pressure groove 34 is formed centrally in the surface of the spool where it is disposed opposite the opening of supply port 31.

On each side of the pressure groove there is an exhaust groove 35, 36. Grooves 34, 35 and 36 are spaced apart by lands 37, 38.

On opposite sides of the set of exhaust grooves, there are cylindrical regions 39, 40, which form portions of the pressure balancing system described herein. These are coextensive with additional grooves which are formed in this embodiment in the wall of the spool passage. As can best be seen in FIGS. 1 and 2, four recesses 41, 42, 43, 44 are evenly spaced around the axis and do not intersect each other. There is a clearance 45 (FIG. 1) between the wall of regions 39 and 40 and the inside wall of the spool passage, which for purposes of discussion herein is exaggerated. It is not shown in FIG. 2. Ordinarily, this clearance will be on the order of only about one-thousandths of an inch when the spool is centered within the sleeve. A pressure supply groove 46 is formed in the outside surface of the sleeve and leads through respective orifices 47, 48, 49, 50, so that pressure supplied from groove 30 to groove 46 through line 51 is made available to all of the orifices and thence to all of the recesses 41-44.

A low pressure groove 55 is axially spaced from the recesses, and a scavenging groove 56 is placed on the other side of the low pressure groove from the recesses. Low pressure groove 55 is connected to exhaust line 57 and scavenging groove 56 is connected to vacuum line 58.

The operation of the device of FIG. 1 should be evident from the drawings. Pressure is supplied to the recesses, through the respective orifices which form a first restriction in the line. A second restriction in the line is formed at the clearance betwen the cylindrical region 39 and the wall of the spool passage. Thence the pressure drops to exhaust levels. Should the spool be moved off axis so that the walls approach each other, then the clearance between them decreases and the pressure drop across this region increases, thereby increasing the pressure within the respective recess, these recesses being essentially isolated from one another. This increase in pressure causes the spool to move back toward the axis. This differential force is also encouraged by what occurs at the diametrically opposite side of the spool, for at this point the pressure drops across this region because of the correspondingly increased spacing. A complete loss of pressure is prevented by the respective one of orifices 47–50. At any rate, the spool now returns toward the center and this motion is completely damped because of the effect of the two opposite recesses. This constitutes known pressure pad techniques, and is effective in any lateral direction. This operation and the corresponding effect is accomplished at region 40, and the connections are duplicated. It will thereby be seen that the structure as shown provides a technique for hydraulically centering the spool of a tracer valve.

FIG. 4 is provided to show that the recesses and the pads which they form need not be formed solely in the wall of the sleeve. Details of the spool valve itself will not be repeated, but instead only those having to do with the centering provisions. For example, there is shown a pressure supply passage 75 which communicates with an axial conduit 76 that supplies orifices 77, 78 and all other orifices which relate to recesses 80, 81, 82, 83. The remainder of the construction is the same as to low pressure grooves and scavenging grooves and corresponding elements bear corresponding numbers. The difference between the structure of FIGS. 4 and 5 from that of FIGS. 1–3 is that the pressure in the pad is supplied in FIG. 1 from the sleeve, while in FIG. 4, it is supplied from the spool. In either event, the operation is the same.

This invention is not to be limited by the embodiments shown in the drawings and described in the description which are given by way of illustration and not of limitation, but only in accordance with the scope of the appended claims.

I claim:

1. In a tracer valve of the class having a sleeve member with an axial sleeve passage bounded at least in part by an internal cylindrical wall, and a spool member inside the sleeve passage, said spool being bounded at least in part by an axially-extending external cylindrical wall, said cylindrical walls being at least in part axially coextensive, the spool member being axially shiftable in the spool passage and there being a clearance between the cylindrical walls, the improvement comprising: a plurality of recesses in one of said cylindrical walls within the coextensive region, said recesses being uniformly spaced around said axis; a pressure conduit through one of said members opening into said recess; an orifice in said pressure conduit; and an exhaust conduit opening into the coextensive region between the walls in adjacency to the recess, each recess and the clearance surrounding it providing a portion of a fluid path from the pressure conduit to the exhaust conduit, whereby upon a lateral displacement of the spool member from concentricity with the sleeve member, the flow section between the walls enlarges at one side and lessens at the other, pressure within the respective recesses thereby lessening and increasing, respectively, whereby the differential pressure between the recesses tends to restore the spool member to concentricity.

2. Apparatus according to claim 1 in which the recesses are formed in the cylindrical wall on the spool member.

3. Apparatus according to claim 1 in which there are provided at least three of said recesses.

4. Apparatus according to claim 1 in which said recesses and conduits are formed at two axially spaced-apart locations.

5. Apparatus according to claim 1 in which the recesses are formed in the cylindrical wall in the sleeve member.

6. Apparatus according to claim 5 in which each pressure conduit comprises a bore through the wall of the sleeve member, and in which the orifice comprises a restriction in the bore within the sleeve.

7. Apparatus according to claim 1 in which the exhaust conduit includes a peripheral groove in one of said cylindrical walls within the coextensive region, and a bore through one of said members opening into said groove.

8. Apparatus according to claim 7 in which a scavenging groove is formed in one of said cylindrical walls within the coextensive region, and a bore through one of said members opening into said scavenging groove, the peripheral groove being placed between the respective recesses and the scavenging groove.

9. A self-aligning tracer valve comprising: a sleeve member with an axial sleeve passage bounded at least in part by an internal cylindrical wall; a spool member inside the sleeve passage, said spool being bounded at least in part by an axially-extending external cylindrical wall, said cylindrical walls being at least in part axially coextensive, the spool member being axially shiftable in the spool passage and there being a clearance between the cylindrical walls; a plurality of recesses in one of said cylindrical walls within the coextensive region, said recesses being uniformly spaced around said axis; a pressure conduit through one of said members opening into each of said recesses; an orifice in said pressure conduit; and an exhaust conduit opening into the coextensive region between the walls in adjacency to the recesses, each recess and the clearance surrounding it providing a portion of a fluid path from the pressure conduit to the exhaust conduit, whereby upon a lateral displacement of the spool member from concentricity with the sleeve member, the flow section between the walls enlarges at one side and lessens at the other, pressure within the respective recesses thereby lessening and increasing, respectively, whereby the differential pressure between the recesses tends to restore the spool member to concentricity.

10. Apparatus according to claim 9 in which the recesses are formed in the cylindrical wall on the spool member.

11. Apparatus according to claim 9 in which there are provided at least three of said recesses.

12. Apparatus according to claim 1 in which said recesses and conduits are formed at two axially spaced-apart locations.

13. Apparatus according to claim 9 in which the recesses are formed in the cylindrical wall in the sleeve member.

14. Apparatus according to claim 13 in which each pressure conduit comprises a bore through the wall of the sleeve member, and in which the orifice comprises a restriction in the bore within the sleeve.

15. Apparatus according to claim 9 in which the exhaust conduit includes a peripheral groove in one of said cylindrical walls within the coextensive region, and a bore through one of said members opening into said groove.

16. Apparatus according to claim 15 in which a scavenging groove is formed in one of said cylindrical walls within the coextensive region, and a bore through one of said members opening into said scavenging groove, the peripheral groove being placed between the respective recesses and the scavenging groove.

No references cited.

M. CARY NELSON, *Primary Examiner.*

ROBERT J. MILLER, *Assistant Examiner.*

UNITED STATES PATENT OFFICE
CERTIFICATE OF CORRECTION

Patent No. 3,370,613                    Dated February 27, 1968

Inventor(s) Paul J. Weaver

It is certified that error appears in the above-identified patent and that said Letters Patent are hereby corrected as shown below:

In the grant (only), the sheet of drawing for Patent No. 3,370,707 was inadvertently inserted in the Patent Grant for Patent No. 3,370,613, and should be canceled.

Signed and sealed this 6th day of October 1970.

(SEAL)
Attest:

EDWARD M. FLETCHER, JR.            WILLIAM E. SCHUYLER, JR.
Attesting Officer                  Commissioner of Patents